(12) United States Patent
Kekatpure et al.

(10) Patent No.: US 8,780,431 B1
(45) Date of Patent: Jul. 15, 2014

(54) PLASMON ABSORPTION MODULATOR SYSTEMS AND METHODS

(75) Inventors: Rohan Deodatta Kekatpure, Albuquerque, NM (US); Paul Davids, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 323 days.

(21) Appl. No.: 13/364,832

(22) Filed: Feb. 2, 2012

(51) Int. Cl.
*G02F 1/01* (2006.01)
*G02B 5/00* (2006.01)

(52) U.S. Cl.
CPC ............................ *G02B 5/008* (2013.01)
USPC ..................................................... 359/245

(58) Field of Classification Search
CPC ........................... G02B 1/00; G02B 5/008
USPC ................... 359/245–248, 321; 385/8, 10
See application file for complete search history.

(56) References Cited

U.S. PATENT DOCUMENTS

2008/0267243 A1* 10/2008 Wang et al. ...................... 372/69

OTHER PUBLICATIONS

Kuo et al., "Strong quantum-confined Stark effect in germanium quantum-well structures on silicon", Nature, vol. 437, Oct. 27, 2005, pp. 1334-1336.
Hochberg et al., "Integrated Plasmon and dielectric waveguides", Optics Express, vol. 12, No. 22, Nov. 1, 2004, 6 pgs.
Zia et al., "Delectric waveguide model for guided surface polaritons", Optics Letters, vol. 30, No. 12, Jun. 15, 2005, pp. 1473-1475.
Zia et al., "Leaky and bound modes of surface plasmon waveguides", Physical Review B71, 2005, pp. 165431-1-165431-9.
Zia et al., "Near-field characterization of guided polariton propagation and cutoff in surface plasmon waveguides", Physical Review B 74, 2006, pp. 165415-1-165415-12.
Zia et al., "Geometries and materials for subwavelength surface plasmon modes", J. Opt. Soc. Am A, vol. 21, No. 12, Dec. 2004, pp. 2442-2446.
Zia et al., "Plasmonics: the next chip-scale technology", Materials Today, vol. 9, No. 7-8, Jul.-Aug. 2006, pp. 20-27.
Knox et al., "Femtosecond Dynamics of Resonantly Excited Excitons in Room-Temperature GaAs Quantum Wells", Physical Review Letters, vol. 54, No. 12, Mar. 25, 1985, pp. 1306-1309.
Wood et al., "High-speed optical modulation with GaAs/GaAlAs quantum wells in a p-i-n diode structure", Appl. Phys. Lett. 44(1), Jan. 1, 1984, pp. 16-18.
Miller et al., "Band-Edge Electroabsorption in Quantum Well Strucutres: The Quantum-Confined Stark Effect", Physical Review Letters, vol. 53, No. 22, Nov. 26, 1984, pp. 2173-2176.

(Continued)

*Primary Examiner* — Joseph P Martinez
(74) *Attorney, Agent, or Firm* — Martin I. Finston

(57) ABSTRACT

Plasmon absorption modulator systems and methods are disclosed. A plasmon absorption modulator system includes a semiconductor substrate, a plurality of quantum well layers stacked on a top surface of the semiconductor substrate, and a metal layer formed on a top surface of the stack of quantum well layers. A method for modulating plasmonic current includes enabling propagation of the plasmonic current along a metal layer, and applying a voltage across the stack of quantum well layers to cause absorption of a portion of energy of the plasmonic current by the stack of quantum well layers. A metamaterial switching system includes a semiconductor substrate, a plurality of quantum well layers stacked on a top surface of the semiconductor substrate, and at least one metamaterial structure formed on a top surface of the stack of quantum well layers.

15 Claims, 6 Drawing Sheets

(56) References Cited

OTHER PUBLICATIONS

Soref et al., "Electrooptical Effects in Silicon", IEEE, Journal of Quantum Electronics, vol. QE-23, No. 1, Jan. 1987, pp. 123-129.
Bozhevolnyi, et al., "Channel plasmon subwavelength waveguide components including interferometers and ring resonators", Nature, vol. 440, Mar. 23, 2006, pp. 508-511.
Gramotnev et al., "Plasmonics beyond the diffraction limit", Nature Photonics, vol. 4, Feb. 2010, pp. 83-91.

* cited by examiner

PLASMON ABSORPTION MODULATOR SYSTEMS AND METHODS

STATEMENT REGARDING FEDERALLY SPONSORED RESEARCH

This invention was developed under Contract DE-AC04-94AL85000 between Sandia Corporation and the U.S. Department of Energy. The U.S. Government has certain rights in this invention.

FIELD OF THE INVENTION

The invention relates generally to plasmonics, and more particular, to modulators for plasmonic devices.

BACKGROUND OF THE INVENTION

In recent years, new types of optoelectronic devices that rely on plasmonic current (also know as surface plasmons) have been developed. These devices include waveguides specifically adapted to confine waves of plasmons for the purpose of transmitting signals. The use of plasmonic current enables a number of advantages over conventional electric current and photonic devices. However, effective modulation of plasmonic current is desirable for plasmonic devices to achieve their full potential. Accordingly, improvements in plasmon modulation are desired.

SUMMARY OF THE INVENTION

Aspects of the present invention are directed to plasmon absorption modulator systems and methods.

In accordance with one aspect of the present invention, a plasmon absorption modulator system is disclosed. The system includes a semiconductor substrate, a plurality of quantum well layers stacked on a top surface of the semiconductor substrate, and a metal layer formed on a top surface of the stack of quantum well layers.

In accordance with another aspect of the present invention, a method for modulating plasmonic current is disclosed. The method includes enabling propagation of the plasmonic current along a metal layer. The metal layer positioned on a stack of quantum well layers formed on a semiconductor substrate. The method also includes applying a voltage across the stack of quantum well layers to cause absorption of a portion of energy of the plasmonic current by the stack of quantum well layers.

In accordance with yet another aspect of the present invention, a metamaterial switching system is disclosed. The switching system includes a semiconductor substrate, a plurality of quantum well layers stacked on a top surface of the semiconductor substrate, and at least one metamaterial structure formed on a top surface of the stack of quantum well layers.

BRIEF DESCRIPTION OF THE DRAWINGS

The invention is best understood from the following detailed description when read in connection with the accompanying drawings, with like elements having the same reference numerals. When a plurality of similar elements are present, a single reference numeral may be assigned to the plurality of similar elements with a small letter designation referring to specific elements. When referring to the elements collectively or to a non-specific one or more of the elements, the small letter designation may be dropped. According to common practice, the various features of the drawings are not drawn to scale unless otherwise indicated. To the contrary, the dimensions of the various features may be expanded or reduced for clarity. Included in the drawings are the following figures.

DETAILED DESCRIPTION OF THE INVENTION

The exemplary systems and methods described herein are usable for modulating plasmonic current (i.e. surface plasmons) and/or switching the operation of metamaterials. Conventionally, a dynamic electrical or optical tuning of plasmonic and metamaterial response was challenging due to the large negative permittivity of metals and the large magnitude of metallic absorption. Such electrical control of surface plasmons is desirable in order to turn the existing static plasmonic devices and metamaterials into tunable devices that allow a dynamic modulation of their electromagnetic response.

The exemplary systems and methods described herein employ a direct intensity modulation of plasmonic current, as opposed to phase-based modulation. In particular, the disclosed systems and methods employ the Quantum-Confined Stark Effect (QCSE), as opposed to free-carrier absorption, to achieve intensity modulation of plasmon energy.

For the purposes of the described embodiments, the QCSE is a shift in the band-edge absorption of a multiple quantum well (MQW) stack under the influence of a transverse electric field. It is a quantum-mechanical effect arising from a change in the overlap of the electron and the hole wave-functions due to an applied electric field. Because of the large magnitude of $\Delta\alpha$ (an absorption constant) achievable by QCSE, integrating surface plasmon waveguides with suitably designed stacks of quantum well layers allows the realization of electrically controlled plasmonic switching. Aspects of the present invention employ such integrations to achieve electrically controlled plasmon modulation. One advantage of the disclosed systems and methods may be the strong absorption modulation provided by the QCSE.

Figure 1:
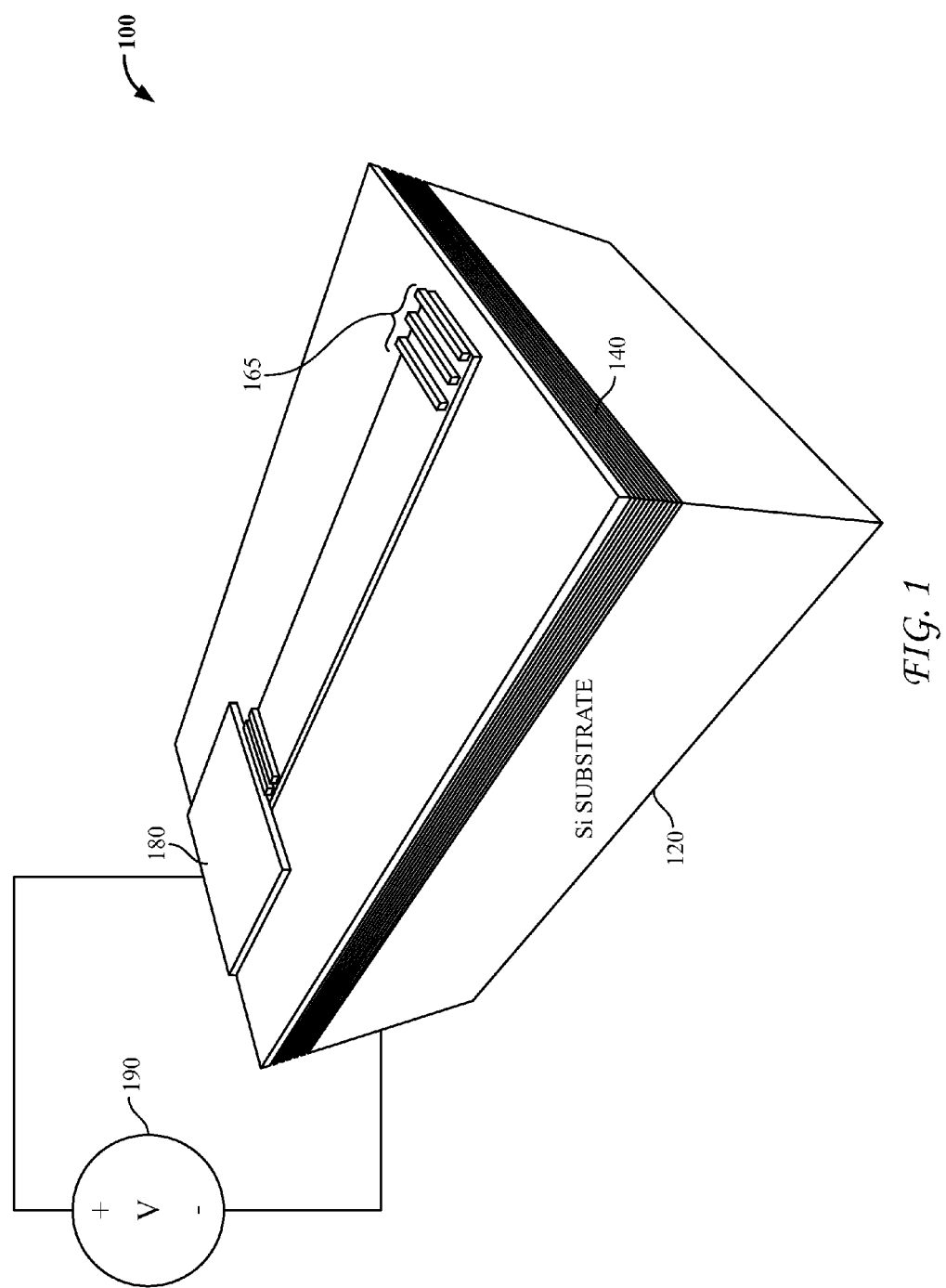
FIG. 1 is a perspective diagram illustrating an exemplary plasmon absorption modulator system in accordance with aspects of the present invention.
Figure 2:
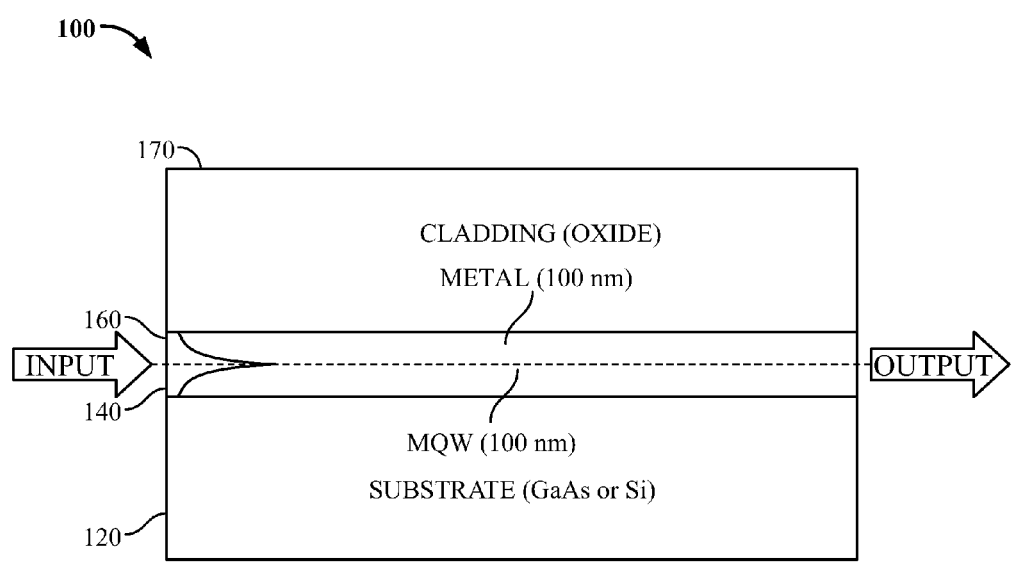
FIG. 2 is a cross-sectional diagram illustrating the modulator system of FIG. 1.

Referring now to the drawings, FIGS. 1 and 2 illustrate an exemplary plasmon absorption modulator system 100 in accordance with aspects of the present invention. Modulator system 100 is usable to modulate an electrical signal onto surface plasmon waves. As a general overview, modulator system 100 includes a substrate 120, a stack of quantum well layers 140, and a metal layer 160. Additional details of modulator system 100 are described below.

Substrate 120 is the base of modulator system 100. Substrate 120 may be a semiconductor substrate and may include additional components and/or interconnects designed to function with electric current, electric voltage, and/or plasmonic waves. In an exemplary embodiment, substrate 120 is a complementary metal-oxide-semiconductor (CMOS) compatible substrate. Suitable materials for use in forming substrate 120 include, for example, silicon, germanium, or gallium arsenide (GaAs).

Quantum well layers 140 are stacked on a top surface of substrate 120. Quantum well layers 140 are configured to selectively absorb energy from plasmons propagating along metal layer 160. The absorption of quantum well layers 140 depends on the voltage applied to the stack of quantum well layers 140. For example, when a first voltage V1 is applied across the stack of quantum well layers 140 (i.e. in the thickness direction of the stack), quantum well layers 140 may absorb a very small amount of the plasmon energy from metal layer 160. When a second voltage V2 is applied across the stack of quantum well layers 140, quantum well layers 140 may absorb at least a significant portion of the plasmon energy from metal layer 160 (i.e. 20% to 50% per micron). The change in absorption of quantum well layers 140 is caused by the Quantum-Confined Stark Effect (QCSE), by which the applied voltage operates to change the bandgap between the quantum well layers in the stack.

Quantum well layers 140 may further be configured to selectively absorb certain wavelengths of electromagnetic radiation based on the materials and geometrical dimensions selected for quantum well layers 140. In an exemplary embodiment, quantum well layers 140 are a multiple quantum well (MQW) stack. The MQW stack includes layers of lower bandgap material, such as Ge or GaAs (depending on the makeup of substrate 120), sandwiched between layers of higher bandgap material, such as SiGe or AlGaAs. The MQW stack includes 10-20 quantum wells, and be approximately 100-200 nm thick. The MQW stack absorbs electromagnetic radiation having wavelengths in the range of 0.5-2.0 μm, which corresponds to the frequency of plasmons. Preferably, the MQW stack absorbs radiation having a wavelength of approximately 1.55 μm, which corresponds to a wavelength used for telecommunications. The MQW stack may be formed, for example, by metal-organic chemical vapor deposition (MOCVD) or molecular beam epitaxy (MBE).

Metal layer 160 is formed on the top surface of the stack of quantum well layers 140 and is configured to enable propagation of plasmons along metal layer 160. In an exemplary embodiment, metal layer 160 may be an elongated metal strip extending in a first direction along the top surface of quantum well layers 140, as shown in FIG. 1. The metal strip may have dielectric material (e.g., a cladding layer) above the strip and on both sides of the strip in order to form a waveguide for confining plasmon waves. The metal strip may be formed, for example, by evaporation or sputtering techniques. Suitable materials for metal layer 160 include, for example, aluminum, gold, copper, and/or silver. Metal layer 160 may be approximately 100-200 nm thick.

Metal layer 160 may include coupling structures 165, as shown in FIG. 1. Coupling structures 165 are configured to receive electromagnetic radiation (e.g., a free-space beam from a near-infrared light source) and generate a plasmonic current in metal layer 160. Coupling structures 165 are also configured to receive plasmonic current propagating along metal layer 160 and generate electromagnetic radiation. In an exemplary embodiment, coupling structures 165 are diffraction grating couplers. Coupling structures 165 may, for example, have a plurality of parallel metal ridges protruding from a top surface of metal layer 160. The example coupling structures 165 are formed at the ends of the elongated metal strip.

It will be understood that modulator system 100 is not limited to the above-described components, but may include alternative or additional components, as set forth by example below.

Modulator system 100 may include a cladding layer 170, as shown in FIG. 2. Cladding layer 170 is formed surrounding metal layer 160. Cladding layer 170 is formed from a material having a lower refractive index than quantum well layers 140 and metal layer 160, in order to confine plasmons to propagate in metal layer 160. In an exemplary embodiment, cladding layer 170 comprises a protective layer of silicon dioxide. Other suitable materials for cladding layer 170 include low refractive index organic materials, such as photoresist.

Modulator system 100 may also include one or more electrodes 180 and a voltage source 190, as shown in FIG. 1. Electrodes 180 are coupled directly to the stack of quantum well layers 140. Voltage source 190 is electrically coupled to the at least one electrode 180. Electrodes 180 are positioned such that voltage source 190 can apply a voltage across the stack of quantum well layers 140. Application of a voltage by voltage source 190 may be used to modulate the plasmonic current propagating along metal layer 160, as will be described in greater detail below. In an exemplary embodiment, electrodes 180 are formed on the top and bottom surfaces of the stack of quantum well layers 140. Suitable materials for electrodes 180 include any conductive metal, including those described above with respect to metal layer 160. Suitable voltage sources 190 will be known to one of ordinary skill in the art from the description herein.

The operation of modulator system 100 will now be described with respect to FIGS. 3A-3D. In an exemplary operation, metal layer 160 receives electromagnetic radiation from a source (not shown) at a coupling structure 165. Coupling structure 165 receives this electromagnetic radiation and generates a wave of surface plasmons (i.e. a plasmonic current) that propagates along metal layer 160. In addition to propagation within metal layer 160, the electromagnetic fields of the plasmon wave extend a short distance (e.g., 100-200 nm) into the quantum well layers 140 beneath metal layer 160. The operation of modulator system 100 incorporates and uses the interaction of this field with the MQW stack. The plasmonic current propagating along metal layer 160 is modulated by applying a voltage to quantum well layers 140, which allows them to absorb energy from the electromagnetic fields that extend into the stack from metal layer 160.

Figure 3A:
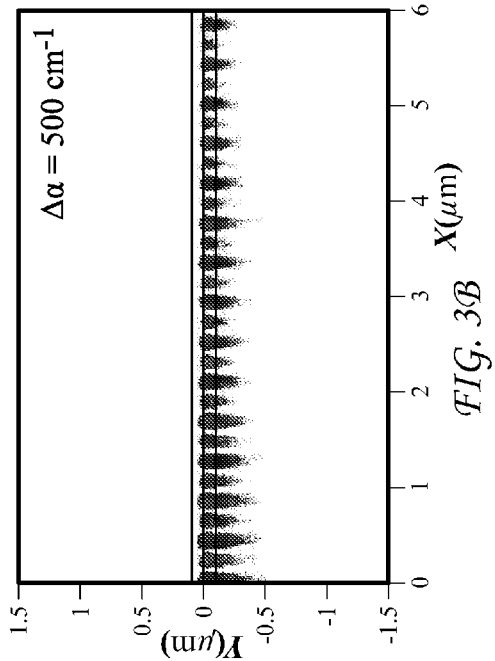
FIGS. 3A, 3B, 3C, and 3D are simulated diagrams illustrating the absorption of plasmon energy by a modulator system in accordance with aspects of the present invention.

When voltage source 190 applies no bias across the stack of quantum well layers 140, as shown in FIG. 3A, quantum well layers 140 absorb substantially none of the energy from the plasmonic current. In this state, the surface plasmon wave propagates with only the intrinsic attenuation caused by metal layer 160.

Figure 3B:
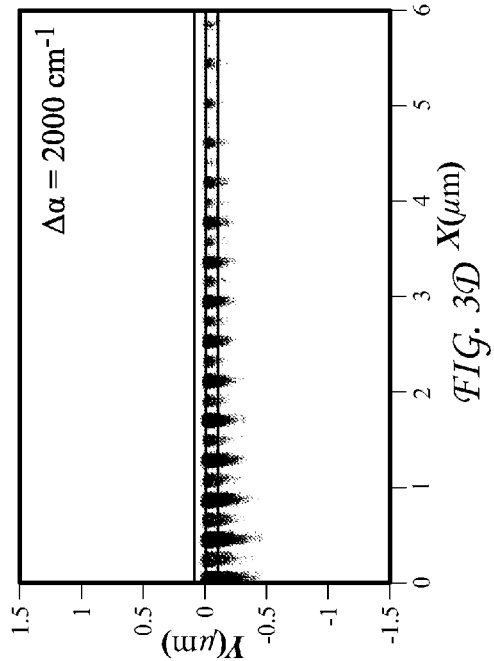
Figure 3C:
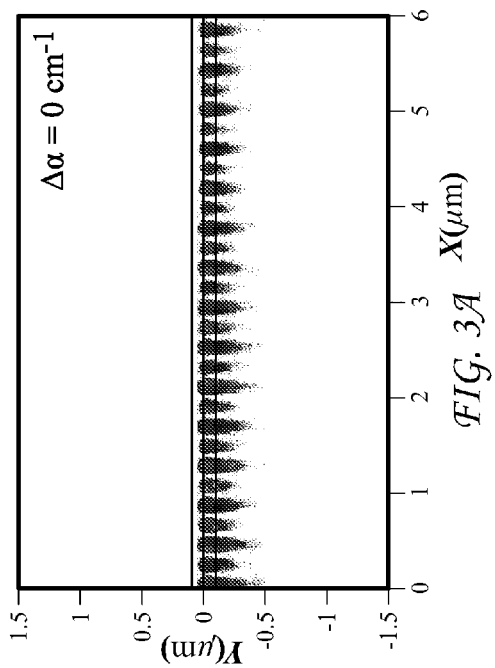
Figure 3D:
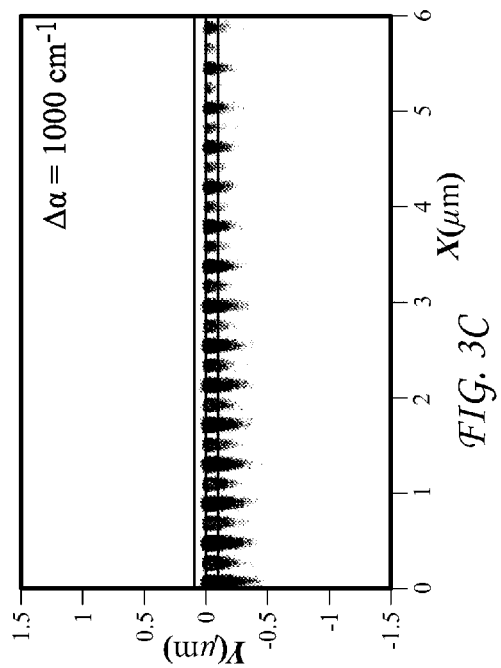

When voltage source 190 applies a bias voltage across the stack of quantum well layers 140, as shown in FIGS. 3B-3D, the quantum well layers 140 absorb at least a portion of the energy from the plasmonic current. The amount of energy absorbed by quantum well layers 140 depends on the bias applied by voltage source 190.

In FIGS. 3B-3D, the amount of absorption of plasmon energy is characterized as $\Delta\alpha$, which represents the plasmon absorption achieved by the quantum well layers 140 per centimeter of propagation along metal layer 160. The absorption is also shown visually through the simulated propagation of plasmons (vertical stripes in FIGS. 3A-3D). As $\Delta\alpha$ increases, plasmon absorption increases, and plasmon intensity drops per centimeter of propagation (along the X-axis in FIGS. 3A-3D).

Figure 4:
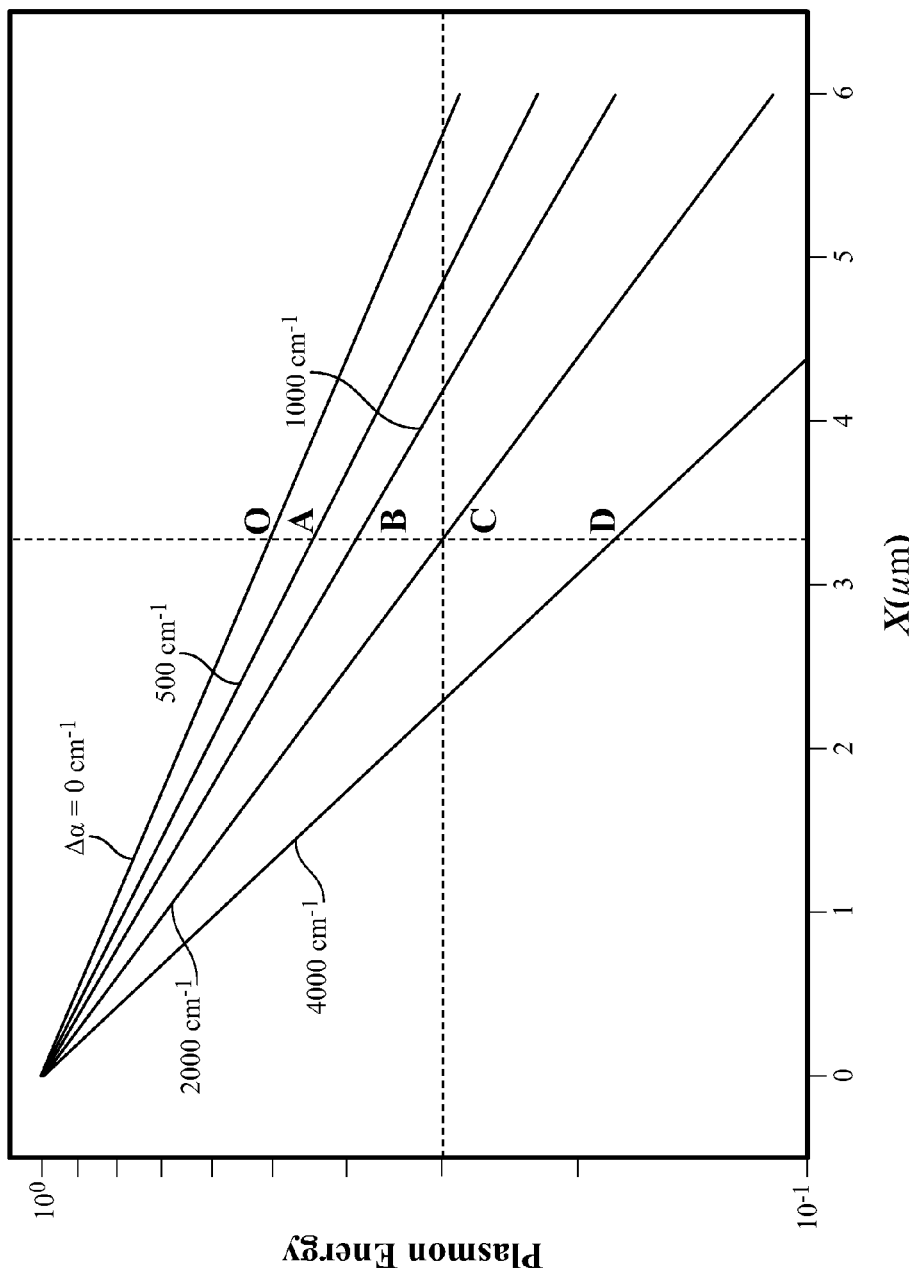
FIG. 4 is a graph illustrating plasmon energy as a function of propagation distance in accordance with aspects of the present invention.

The modulation contrast with increased MQW absorption is further illustrated in FIG. 4, which shows a graph of plasmon energy as a function of the propagation distance. In FIG. 4, the $\Delta\alpha=0$ cm-1 line represents the unbiased, intrinsic attenuation of plasmonic current in modulator system 100. The intersect between this line and the vertical line, point O, represents the insertion loss (IL) of modulator system 100 (where the active region of modulator system 100 has a length of about 3 µm). The values of the plasmon energy at the intersection of the vertical line with the curves for various absorption values yield the modulation depths obtained for various applied electrical biases. Clearly, deeper modulation depths are achievable for larger values of the tolerable IL (corresponding to shifting the vertical line to the right, and lengthening the active region of modulator system 100).

Voltage source 190 may be operated in order to modulate a signal onto the plasmonic current that propagates along metal layer 160. For example, voltage source 190 may selective apply a bias voltage in order to selectively absorb energy from a steady plasmonic current. The resulting plasmonic current will have a varying energy corresponding to the signal modulated by voltage source 190. Electromagnetic radiation including the signal may then be emitted by modulator system 100 using coupling structure 165.

Figure 5:
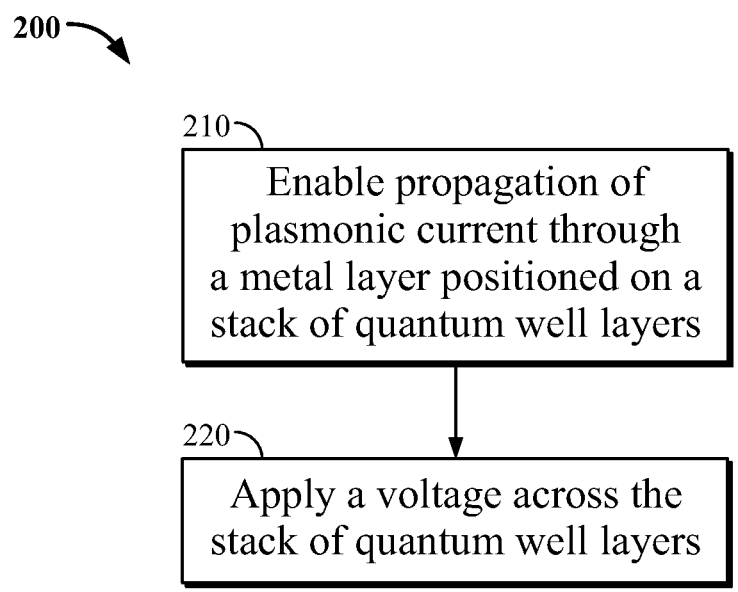
FIG. 5 is a flowchart illustrating an exemplary method for modulating plasmonic current in accordance with aspects of the present invention.

FIG. 5 is a flowchart illustrating an exemplary method 200 for modulating plasmonic current in accordance with aspects of the present invention. Method 200 is usable to modulate a signal onto plasmonic current. As a general overview, method 200 includes enabling propagation of a plasmonic current and applying a voltage to a stack of quantum well layers. Additional details of method 200 are described herein with respect to the components of modulator system 100.

In step 210, plasmonic current is enabled to propagate along a metal layer. In an exemplary embodiment, a wave of surface plasmons (i.e. a plasmonic current) propagates along metal layer 160. As set forth above, metal layer 160 is formed on a top surface of the stack of quantum well layers 140, which is in turn formed on semiconductor substrate 120.

The plasmonic current may be generated at one end of the metal layer using a coupling structure formed on the metal layer. In an exemplary embodiment, coupling structure 165 receives electromagnetic radiation from a source (e.g., from a near-infrared light source) and generates the wave of surface plasmons that propagates along metal layer 160.

In step 220, a voltage is applied to the stack of quantum well layers. In an exemplary embodiment, voltage source 190 applies a bias voltage via electrode 180 across the stack of quantum well layers 140. Application of the bias voltage by voltage source 190 causes the quantum well layers 140 absorb at least a portion of the energy from the plasmonic current.

The voltage may be applied in order to in order to modulate a signal onto the plasmonic current. In an exemplary embodiment, voltage source 190 selective applies a bias voltage via electrode 180 across the stack of quantum well layers 140. Selective application of the bias voltage causes the quantum well layers 140 to selectively absorb the energy from the plasmonic current. The resulting plasmonic current will have a varying energy corresponding to the signal modulated by voltage source 190. Electromagnetic radiation including the signal may then be emitted by modulator system 100 using coupling structure 165.

Figure 6:
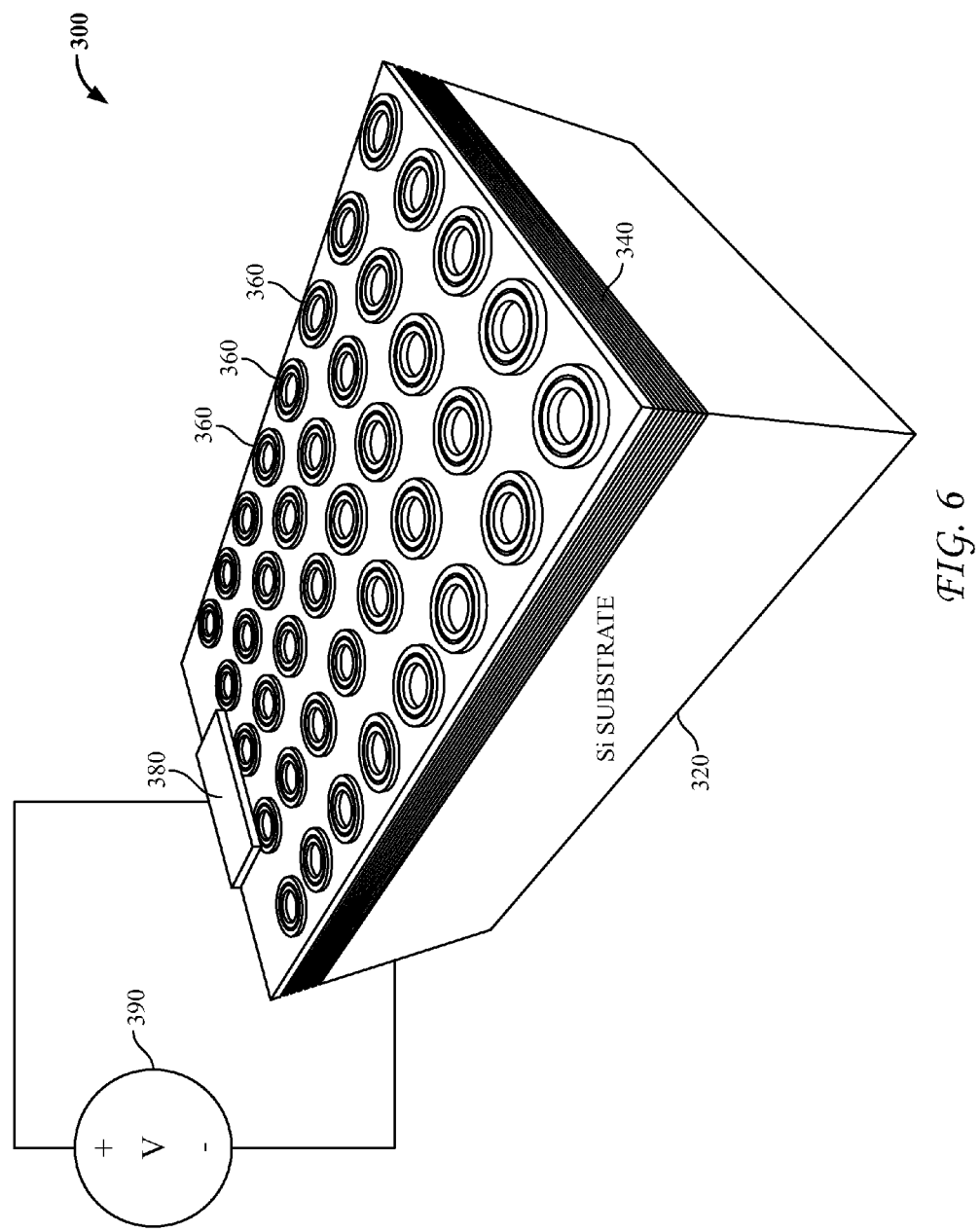
FIG. 6 is a perspective diagram illustrating an exemplary metamaterial switching system in accordance with aspects of the present invention.

FIG. 6 illustrates an exemplary metamaterial switching system 300 in accordance with aspects of the present invention. Switching system 300 is usable to selectively actuate metamaterial structures. As a general overview, switching system 300 includes a substrate 320, a stack of quantum well layers 340, and at least one metamaterial structure 360. Additional details of switching system 300 are described below.

Substrate 320 is the base of switching system 300. Substrate 320 is a semiconductor substrate substantially the same as that described above with respect to substrate 120.

Quantum well layers 340 are stacked on a top surface of substrate 320. The stack of quantum well layers 340 is substantially the same as that described above with respect to quantum well layers 140.

Metamaterial structure 360 is formed on the top surface of the stack of quantum well layers 340. Metamaterial structure 360 is configured to resonate when exposed to electromagnetic radiation. Metamaterial structure 360 has a resonant frequency in the range of 150-600 THz, which corresponds to the frequency of visible/near-infrared plasmons. In an exemplary embodiment, metamaterial structure 360 is a split ring resonator.

It will be understood that switching system 300 is not limited to the above-described components. As shown in FIG. 6, switching system 300 may include an array of metamaterial structures 360. Further, switching system 300 may include additional components, such as a cladding layer, electrodes, and a voltage source, as described above with respect to modulator system 100.

The operation of switching system 300 will now be described. In an exemplary operation, metamaterial structure 360 is exposed to electromagnetic radiation from a source (not shown). The electromagnetic radiation causes metamaterial structure 360 to resonate at a given frequency which corresponds to the frequency of plasmons.

Metamaterial structure 360 may be switched on or off by applying a voltage to quantum well layers 340. When voltage source 390 applies no bias across the stack of quantum well layers 340, quantum well layers 340 absorb essentially none of the resonating energy from metamaterial structure 360 (i.e., metamaterial structure 360 is switched "on"). When voltage source 390 applies a bias voltage via electrode 380 across the stack of quantum well layers 340, the quantum well layers 340 absorb the resonating energy from metamaterial structure 360 (i.e., metamaterial structure 360 is switched "off"). The amount of energy absorbed by quantum well layers 340 depends on the bias applied by voltage source 390, as described above with respect to modulator system 100. By changing the amount of energy absorbed by quantum well layers 340, switching system 300 may also be used to tune the resonant frequency, transmission, reflection, amplitude, and/or phase response of metamaterial structure 360.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A plasmon absorption modulator system comprising:
   a semiconductor substrate having a top surface;
   a variable absorption layer;
   a metal layer having a length parallel to the top surface of the semiconductor substrate and configured to enable propagation of plasmons along its length; and
   a coupling structure configured to receive electromagnetic radiation and in response to such received radiation to generate a plasmonic current in the metal layer, and/or to receive plasmonic current from the metal layer and in response to such received current to generate and transmit electromagnetic radiation;

wherein the variable absorption layer comprises a plurality of quantum well layers stacked on a top surface of the semiconductor substrate;

wherein the metal layer is formed on a top surface of the stack of quantum well layers; and wherein the variable absorption layer is configured to attenuate plasmons of at least some frequencies propagating along the metal layer by an amount that depends on a voltage applied across the stack of quantum well layers.

2. The system of claim 1, wherein the metal layer comprises an elongated metal strip extending in a first direction along the top surface of the stack of quantum well layers.

3. The system of claim 1, wherein at least one said coupling structure is formed on at least one end of the metal layer.

4. The system of claim 3, wherein the coupling structure comprises a diffraction grating.

5. The system of claim 1, further comprising:
a cladding layer formed at least partially surrounding the metal layer.

6. The system of claim 1, further comprising:
an electrode directly coupled to the stack of quantum well layers; and
a voltage source electrically coupled to the electrode, the voltage source configured to apply a voltage across the stack of quantum well layers to modulate a plasmonic current propagating in the metal layer.

7. The system of claim 6, wherein the voltage source is configured to apply a voltage across the stack of quantum well layers in order to modulate a signal onto the plasmonic current propagating in the metal layer.

8. A method for modulating plasmonic current comprising:
enabling propagation of the plasmonic current along a metal layer, the metal layer positioned on a stack of quantum well layers formed on a semiconductor substrate; and
applying a voltage across the stack of quantum well layers to cause absorption of a portion of energy of the plasmonic current by the stack of quantum well layers.

9. The method of claim 8, further comprising:
generating the plasmonic current at one end of the metal layer with a coupling structure formed on the metal layer.

10. The method of claim 8, wherein the applying step comprises:
applying a voltage across the stack of quantum well layers in order to modulate a signal onto the plasmonic current.

11. The method of claim 10, further comprising:
emitting electromagnetic radiation including the signal from the metal layer with a coupling structure formed on the metal layer.

12. A metamaterial switching system comprising:
a semiconductor substrate having a top surface;
a variable absorption layer; and
at least one metamaterial structure;
wherein the variable absorption layer comprises a plurality of quantum well layers stacked on a top surface of the semiconductor substrate;
wherein at least one said metamaterial structure is formed on a top surface of the stack of quantum well layers; and
wherein the variable absorption layer is configured to switch on or off an operation of at least one said metamaterial structure in response to a voltage applied across the stack of quantum well layers.

13. The system of claim 12, wherein the at least one metamaterial structure comprises an array of metamaterial structures.

14. The system of claim 13, wherein the array of metamaterial structures comprises an array of split ring resonators.

15. The system of claim 12, further comprising:
an electrode directly coupled to the stack of quantum well layers; and
a voltage source electrically coupled to the electrode, the voltage source configured to apply a voltage across the stack of quantum well layers to switch on or off an operation of the at least one metamaterial structure.

* * * * *